United States Patent
Park et al.

(10) Patent No.: US 9,904,078 B2
(45) Date of Patent: Feb. 27, 2018

(54) OPTICAL MODULATOR INCLUDING MULTIPLE QUANTUM WELL AND CARRIER BLOCKS AND 3D IMAGE ACQUISITION APPARATUS INCLUDING THE SAME

(71) Applicant: Samsung Electronics Co., Ltd., Suwon-si (KR)

(72) Inventors: Chang-young Park, Yongin-si (KR); Yong-hwa Park, Yongin-si (KR); Sang-hun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 365 days.

(21) Appl. No.: 14/314,798

(22) Filed: Jun. 25, 2014

(65) Prior Publication Data
US 2015/0054925 A1   Feb. 26, 2015

(30) Foreign Application Priority Data
Aug. 21, 2013   (KR) .................. 10-2013-0099240

(51) Int. Cl.
*H01L 29/06*   (2006.01)
*G02F 1/017*   (2006.01)
*G01S 7/481*   (2006.01)

(52) U.S. Cl.
CPC ............ *G02F 1/017* (2013.01); *G01S 7/4814* (2013.01); *G02F 2201/16* (2013.01)

(58) Field of Classification Search
CPC ......... G02B 13/16; B82Y 20/00; G02F 1/017; G02F 1/218; G02F 2001/0155; G02F 2201/307; G02F 2203/12; G02F 2201/16; G01S 7/4814; H01L 33/06; H01L 33/0025; H01L 33/02; H01L 33/08; H01L 33/14
USPC .............................................................. 257/9
See application file for complete search history.

(56) References Cited

U.S. PATENT DOCUMENTS

| | | | |
|---|---|---|---|
| 6,534,783 B1 * | 3/2003 | Wu ................. | H01L 31/035236 257/184 |
| 7,583,714 B2 | 9/2009 | Nakahara et al. | |
| 2002/0094004 A1 * | 7/2002 | Furukawa ........... | H01S 5/18397 372/46.01 |
| 2006/0054899 A1 | 3/2006 | Takahashi et al. | |

(Continued)

FOREIGN PATENT DOCUMENTS

| | | |
|---|---|---|
| JP | 2004-347650 A | 12/2004 |
| JP | 2010-080757 A | 4/2010 |

(Continued)

OTHER PUBLICATIONS

Goossen, et al.; "Electroabsorption in Ultranarrow-Barrier GaAs/AlGaAs Multiple Quantum Well Modulators", Applied Physics Letters, Feb. 28, 1994, vol. 64 No. 9, pp. 1071-1073.

(Continued)

*Primary Examiner* — Duy T Nguyen
(74) *Attorney, Agent, or Firm* — Sughrue Mion, PLLC

(57) ABSTRACT

An optical modulator and a 3D image acquisition apparatus including an optical modulator are provided. The optical modulator is disposed in a multiple quantum well including a plurality of quantum wells and a plurality of quantum barriers, and includes at least one carrier block disposed in the multiple quantum well restricting the carrier movement between the multiple quantum wells.

15 Claims, 10 Drawing Sheets

(56) References Cited

U.S. PATENT DOCUMENTS

| | | | |
|---|---|---|---|
| 2007/0170448 A1* | 7/2007 | Ito ........................... | H01L 33/58 257/98 |
| 2008/0023690 A1* | 1/2008 | Moon .................... | B82Y 20/00 257/13 |
| 2011/0181936 A1* | 7/2011 | Cho ....................... | B82Y 20/00 359/260 |
| 2013/0016746 A1* | 1/2013 | Strittmatter ............ | B82Y 20/00 372/29.015 |
| 2013/0039376 A1* | 2/2013 | Eichler .................. | B82Y 20/00 372/45.01 |
| 2013/0175500 A1* | 7/2013 | Cho ....................... | B82Y 20/00 257/21 |

FOREIGN PATENT DOCUMENTS

| | | |
|---|---|---|
| KR | 10-2011-0086364 A | 7/2011 |
| KR | 10-2012-0075182 A | 7/2012 |

OTHER PUBLICATIONS

Chang, et al.; "Design and Fabrication of Temperature-Insensitive InGaP—InGaAlP Resonant-Cavity Light-Emitting Diodes", IEEE Photonics Technology Letters, Aug. 15, 2006, vol. 18, No. 16, pp. 1690-1692.

\* cited by examiner

OPTICAL MODULATOR INCLUDING MULTIPLE QUANTUM WELL AND CARRIER BLOCKS AND 3D IMAGE ACQUISITION APPARATUS INCLUDING THE SAME

CROSS-REFERENCE TO RELATED APPLICATIONS

This application claims priority from Korean Patent Application No. 10-2013-0099240, filed on Aug. 21, 2013 in the Korean Intellectual Property Office, the disclosure of which is incorporated herein in its entirety by reference.

BACKGROUND

1. Field

Apparatus consistent with exemplary embodiments relate to an optical modulator and a 3D image acquisition apparatus including an optical modulator, and more particularly, to an optical modulator generating optical confinement and a 3D image acquisition apparatus including an optical modulator generating optical confinement.

2. Description of the Related Art

Conventional 3D cameras, comprising conventional image shooting functions, incorporate a measuring function for measuring the distance between a plurality of points on the surface of a subject and the camera. At present, several algorithms are available for measuring the distance between a subject and a 3D camera, among which the Time-of-Flight (TOF) method is widely used. The TOF method incorporates projecting an illumination signal at a subject and measuring the flight time for the illumination reflect from the subject, and arrive back at a receiving unit. The flight time of the illumination signal may be measured by a phase delay. Furthermore, a high-speed optical modulator may be used for an accurate measurement of the phase delay.

The characteristic of transmittance difference of an optical modulator (optical shutter), which is used to obtain the depth information in a 3D camera, is the most important factor in 3D image realization because a bigger transmittance difference enables an improved accuracy and a higher 3D image quality.

Transmittance difference is the difference in the transmittance due to a quantum-confined Stark effect (QCSE) of a particular wave depending on whether voltage is applied to the optical modulator. When the voltage is not applied to the optical modulator, the optical modulator enters a shutter-open status, and when the voltage is applied to the optical modulator, the transmission-type optical modulator enters a shutter-close status. Therefore, by decreasing the transmissivity when the voltage is not applied or increasing the transmissivity when the voltage is applied, the transmittance difference of the optical modulator may be enhanced. Particularly, decreasing the transmissivity when the voltage is not applied may enhance the quality of the 3D image.

SUMMARY OF THE INVENTION

Exemplary embodiments are provided to address the aforementioned and other problems and disadvantages occurring in the related art, and an aspect of the present disclosure provides an optical modulator with an enhanced light confinement effect, an optical modulator reducing light loss at areas where the light confinement effect is low, and a 3D image acquisition apparatus including the optical modulator.

According to an aspect of an exemplary embodiment, an optical modulator may include a multiple quantum well (MQW), and at least one carrier block disposed in the MQW to restrict carrier movement within the MQW, where the MQW includes a plurality of quantum wells (QWs) and a plurality of quantum barriers (QBs).

The energy band of the at least one carrier block may be higher than the energy band of the plurality of QBs in the MQW.

The at least one carrier block may be formed of a transparent material.

The refractive index of the at least one carrier block may be greater than the refractive index of the plurality of QBs in the MQW.

The total optical thickness of the MQW may be equal to $N*(\lambda/2)$, where $\lambda$ is a resonance wavelength and N is an integer.

The MQW may be sub-divided into a plurality of sub-multiple quantum wells, each comprising more than one of the plurality of QWs and more than one of the plurality of QBs.

The MQW and the carrier block may be part of an activation layer of the optical modulator.

The MQW is symmetrical about a center of the activation layer.

The optical modulator may further include a bottom reflection layer, a top reflection layer, where the bottom reflection layer may be disposed on a bottom surface of the activation layer, and the top reflection layer may be disposed on a top surface of the activation layer.

The optical modulator may be a transmission type optical modulator.

The reflectance of the bottom reflection layer may be equal to the reflectance of the top reflection layer.

At least one of the bottom reflection layer and the top reflection layer may include at least one micro-cavity layer, and thickness of the at least one micro-cavity layer may be equal to $N*(\lambda/2)$, where $\lambda$ is a resonance wavelength and N is an integer.

The bottom reflection layer may include a first refractive index layer and a second refractive index layer, the thickness of the second refractive index layer being different from the first refractive index layer, the top reflection layer may include a third refractive index layer and a fourth refractive index layer, the thickness of the fourth refractive index layer being different from the third refractive index layer, the first refractive index layer and the second refractive index layer may be alternately laminated, and the third refractive index layer and the fourth refractive index layer may be alternately laminated.

The micro-cavity layer may be made with a material same as a material used to make at least one of the first refractive index layer, the second refractive index layer, the third refractive index layer and the fourth refractive index layer.

According to an aspect of another exemplary embodiment, an optical modulator may include a first multiple quantum well (MQW) which may include a first plurality of quantum wells (QWs) and a first plurality of quantum barriers (QBs), a second multiple quantum well (MQW) which may include a second plurality of quantum wells (QWs) and a second plurality of quantum barriers (QBs), and a carrier block which is be disposed in between the first MQW and the second MQW to restrict carrier movement between the first MQW and the second MQW.

At least one of the first MQW and second MQW may have an optical thickness that is equal to $N*(\lambda/2)$, where $\lambda$ is a resonance wavelength and N is an integer.

The carrier block may be in contact with the QB of the first MQW and the QB of the second MQW.

The thickness of the first MQW may be equal to the thickness of the second MQW.

The thickness of the first MQW may be different from the thickness of the second MQW.

According to an aspect of another exemplary embodiment, a 3D image acquisition apparatus may include a light source transmitting light toward a subject; a light modulator as prescribed above which modulates the reflected light from the subject; an image pickup device which generates an image, based on the light modulated by the optical modulator; and a signal processing unit which calculates the depth information indicating a distance of the subject from the 3D image acquisition apparatus, based on the image of the image pickup device.

the 3D image acquisition apparatus may further include a first lens which concentrates the reflected light to the optical modulator; and a filter, located between the first lens and the optical modulator which transmits light of a particular wavelength from among all wavelengths received in the reflected light.

The light may include a laser diode (LD) or a light emitting diode (LED) in the infrared light band.

The 3D image acquisition apparatus may further include a second lens, located between the optical modulator and the image pickup device, which concentrates the modulated reflected light into a range of the image pickup device.

Additional aspects will be set forth in part in the description which follows and, in part, will be apparent from the description, or may be learned by practice of the presented embodiments.

BRIEF DESCRIPTION OF THE DRAWINGS

The above and/or other aspects will become apparent and more readily appreciated by describing certain exemplary embodiments with reference to the accompanying drawings in which.

DETAILED DESCRIPTION OF EXEMPLARY EMBODIMENTS

Figure 1A:
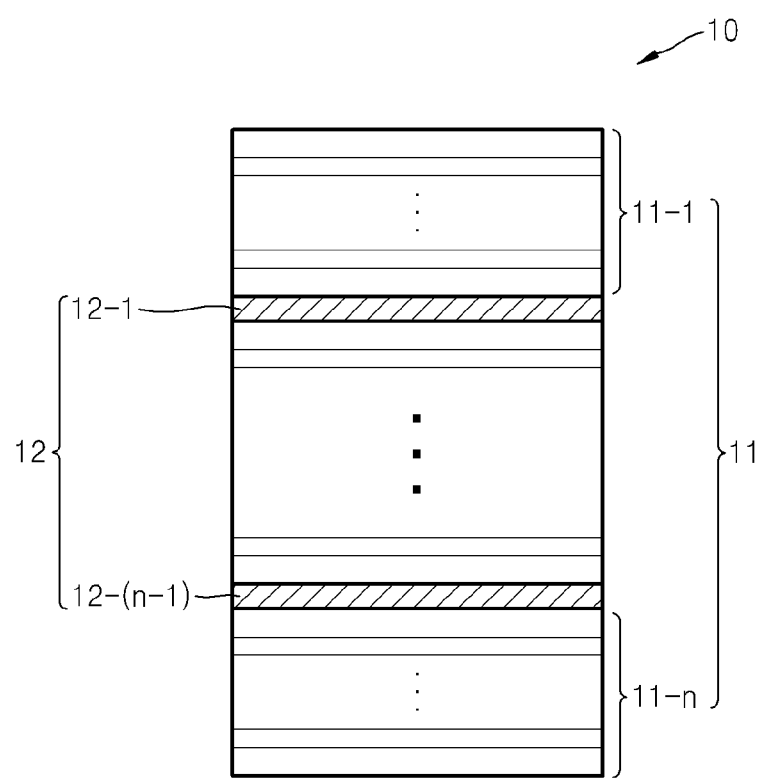
FIG. 1A illustrates an activation layer applied to an optical modulator according to an exemplary embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Hereinafter, the exemplary embodiments will be described with reference to the attached drawings. Well-known functions or constructions are not described in detail since they would obscure the application with unnecessary detail.

Hereinafter, the expression "top part" or "top", in reference to the layer structure, may be interpreted to mean "in contact with and above" as well as "not in contact with and above".

Figure 1B:
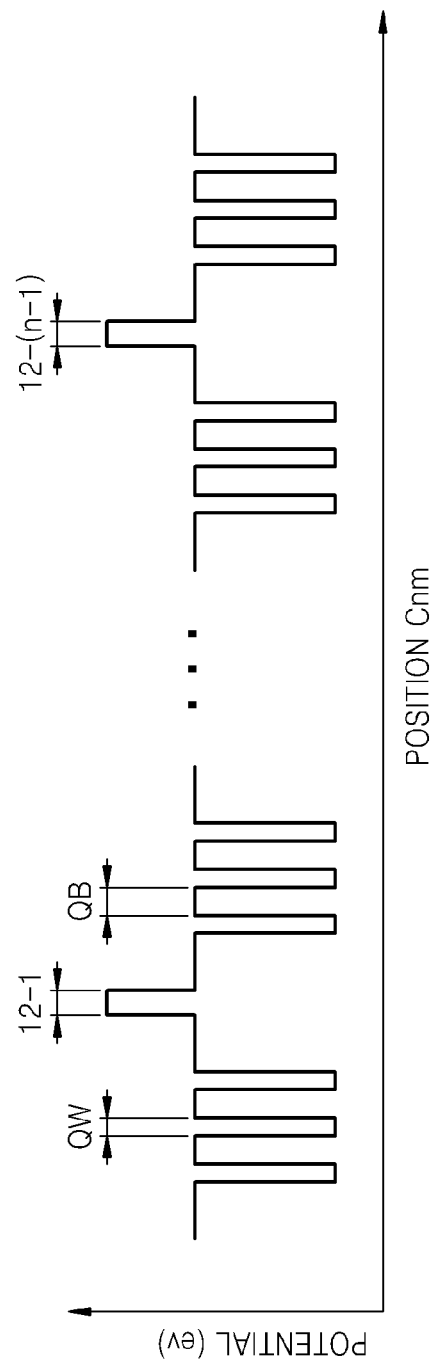
FIG. 1B illustrates a brief energy band diagram of the activation layer illustrated in FIG. 1A.
Figure 5:
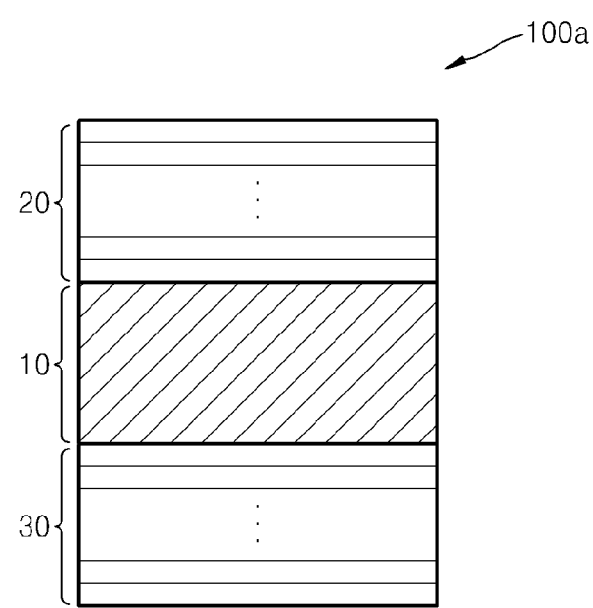
FIG. 5 illustrates an optical modulator including the activation layer illustrated in FIG. 1A according to an exemplary embodiment.

FIG. 1A illustrates an activation layer 10 applied to an optical modulator 100a (as shown in FIG. 5), and FIG. 1B illustrates a brief energy band diagram of the activation layer 10 illustrated in FIG. 1B.

According to an exemplary embodiment, the activation layer 10 is a layer where light is absorbed, and where a standing wave with a particular wavelength is generated. For this purpose, the optical thickness of the activation layer 10 may be set as an integer multiple of $\lambda/2$. Here, $\lambda$ is the wavelength of the center wave of the incident light to be modulated.

The activation layer 10 may include a multiple quantum well (MQW) 11, which includes a plurality of quantum wells (QWs), a plurality of quantum barriers (QBs), and at least one carrier block 12-1, 12-2, ... 12-(n−1) which is disposed in the MQW 11 and restricts the carrier movement within the MQW 11. In consideration of the generation of standing waves, the MQW 11 may be disposed for higher light absorption range, and the carrier block 12 may be disposed for lower light absorption range. Thus, the MQW 11 may enhance the transmittance characteristics of light, while the carrier block 12 may concentrate light into the MQW 11 to increase light absorption efficiency. Furthermore, as the light absorption efficiency of the activation layer 10 increases, light transmissivity may be additionally enhanced.

The MQW 11 may be divided into multiple numbers of sub-MQWs (11-1, 11-2 ... 11-n, n being a natural number) by the carrier block 12. In each sub-MQW (11-1, 11-2 ... 11-n), more than one quantum well (QW) and more than one quantum barrier (QB) may be alternately disposed. At least one of the sub-MQWs (11-1, 11-2 ... 11-n) may have an optical thickness equal to an integer multiple of $\lambda/2$. Each sub-MQW (11-1, 11-2 ... 11-n) is illustrated in such a way that three QWs and four QBs are disposed alternately, but the number of QWs and QBs may not be limited thereto. Each sub-MQW (11-1, 11-2 ... 11-n) may alternately include more than one QW and more than one QB, and the number and thickness of QWs disposed in each sub-MQW (11-1, 11-2 ... 11-n) may be different based on a wavelength. The number and thickness of QWs disposed in sub-MQWs (11-1, 11-2 . . . 11-n) may or may not be the same. The sub-MQWs (11-1, 11-2 . . . 11-n) may be symmetrical.

The material of the QW and the QB disposed in the MQW 11 may be diversely selected with based on the wavelength band of the light to be modulated. According to exemplary embodiments, the QW may be formed by: $Al_xGa_{1-x}As$ (0<x<1), $In_xGa_{1-x}As$, $In_{1-x-y}Ga_xAl_yAs$ (0<x, y<1), and $In_{1-x}Ga_xAs_zP_{1-z}$ (0<x, z<1), and the QB may be formed by: $Al_xGa_{1-x}As$ (0<x<1), $In_xGa_{1-x}P$ (0<x<1), $In_{1-x-y}Ga_xAl_yAs$ (0<x, y<1), and $In_{1-x}Ga_xAs_zP_{1-z}$ (0<x, z<1) [Al—Aluminum, Ga—Galium, As—Arsenic, In—Indium, P—Phosphorous]. For example, in the infrared range of 850 nm, GaAs may be used to form the QW and $Al_xGa_{1-x}As$ (0<x<1) may be used to form the QB. In the medium infrared range of 1550 nm, $In_xGa_{1-x}As$, $In_{1-x-y}Ga_xAl_yAs$, and $In_{1-x}Ga_xAs_zP_{1-z}$ may be used to form the QW, and $In_{1-x-y}Ga_xAl_yAs$ and $In_{1-x}Ga_xAs_zP_{1-z}$ (herein, 0<x, y, z<1) may be used to form the QB, in various combinations.

The carrier block 12, as illustrated in FIG. 1B, may have a higher energy band than the energy band of the sub-MQWs (11-1, 11-2 . . . 11-n). For example, the energy band of the carrier block 12 may be higher than the energy band of the QB in the MQW 11. Furthermore, the refractive index of the carrier block 12 may be higher than the refractive index of the QB in the MQW 11. Thus, the carrier block 12 may restrict the carrier movement between the sub-MQWs (11-1, 11-2 . . . 11-n). When the QB is formed by $Al_xGa_{1-x}As$ and the carrier block 12 is formed by $Al_yGa_{1-y}As$, the Al composition of the carrier block 12 may be higher than the Al composition of the QB. The thickness of the carrier block 12 may be small.

The carrier block 12 may be formed by a transparent material and allow the incident light to transmit. The material of the carrier block 12 may have a higher energy band than the QB, and may use $Al_xGa_{1-x}As$ ($0.31 < x \leq 1$) or InGaP. Furthermore, the carrier block 12 may be in contact the QB in neighboring sub-MQWs (11-1, 11-2 . . . 11-n). The thickness of the carrier block 12 may be small. For example, the thickness of the carrier block 12 may be from 1 nm to 100 nm.

According to an exemplary embodiment, when the MQW 11 in the activation layer 10 absorbs light, a carrier, for example an electron, may have a higher energy than the QB and, thus, may not stay in one QW but disperse to another QW. However, since a carrier block 12, that has a higher energy than the carrier, is disposed in the activation layer 10 and separates the MQW 11 into multiple numbers of sub-MQWs (11-1, 11-2 . . . 11-n), according to an exemplary embodiment, the carrier may stay in the corresponding sub-MQW (11-1, 11-2 . . . 11-n). Therefore, the dispersion of a carrier between sub-MQWs (11-1, 11-2 . . . 11-n) may be reduced and light may be concentrated into the corresponding sub-MQW (11-1, 11-2 . . . 11-n). Accordingly, the absorption efficiency of the activation layer 10 may be enhanced. With the absorption efficiency of the activation layer 10 enhanced, light transmittance may be reduced when no voltage is applied to activation layer 10.

Figure 2A:
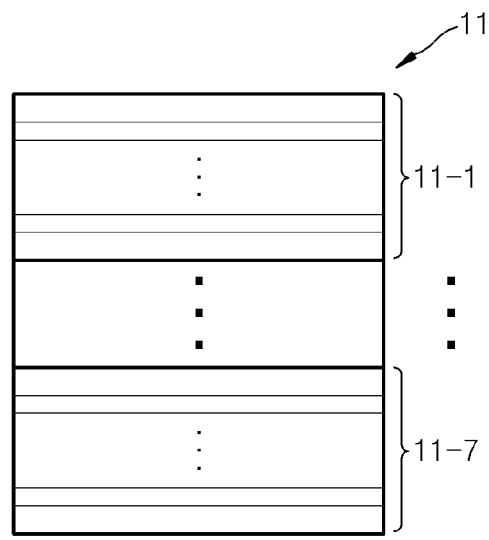
FIG. 2A illustrates comparative activation layers according to an exemplary embodiment.

FIG. 2A illustrates an exemplary embodiment of an activation layer 11. As illustrated in FIG. 2A, the activation layer 11 (11-1, 11-2 . . . 11-7) may have a structure of an MQW including only QWs and QBs. The QB may be disposed on the lowest side and the highest side of the activation layer 11, and both the QW and the QB may be alternately disposed in the central region of the activation layer 11. The resonance wavelength λ may be 850 nm, and the optical thickness of the activation layer 11 may be 3.5λ.

Figure 2B:
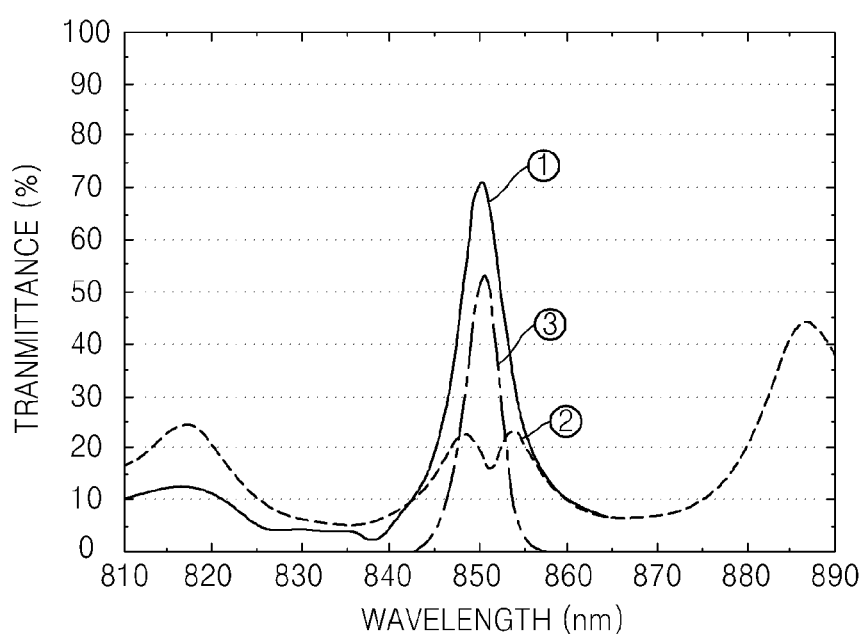
FIG. 2B illustrates a simulation result of the transmittance characteristics of the comparative activation layers.

FIG. 2B illustrates the simulation result, according to an exemplary embodiment, of transmittance characteristics of the activation layer 11 as shown in FIG. 2A. In FIG. 2B, graph '①' represents the transmittance when a voltage is applied to the activation layer 11. The transmittance is approximately 70.8% in the wavelength band of 850 nm. Graph '②' represents the transmittance when a voltage is not applied to the activation layer 11. The transmittance is approximately 18% in the wavelength band of 850 nm. Graph '③' represents the transmittance difference between graph '①' and graph '②' which is approximately 52.8% in the wavelength band of 850 nm.

Figure 3A:
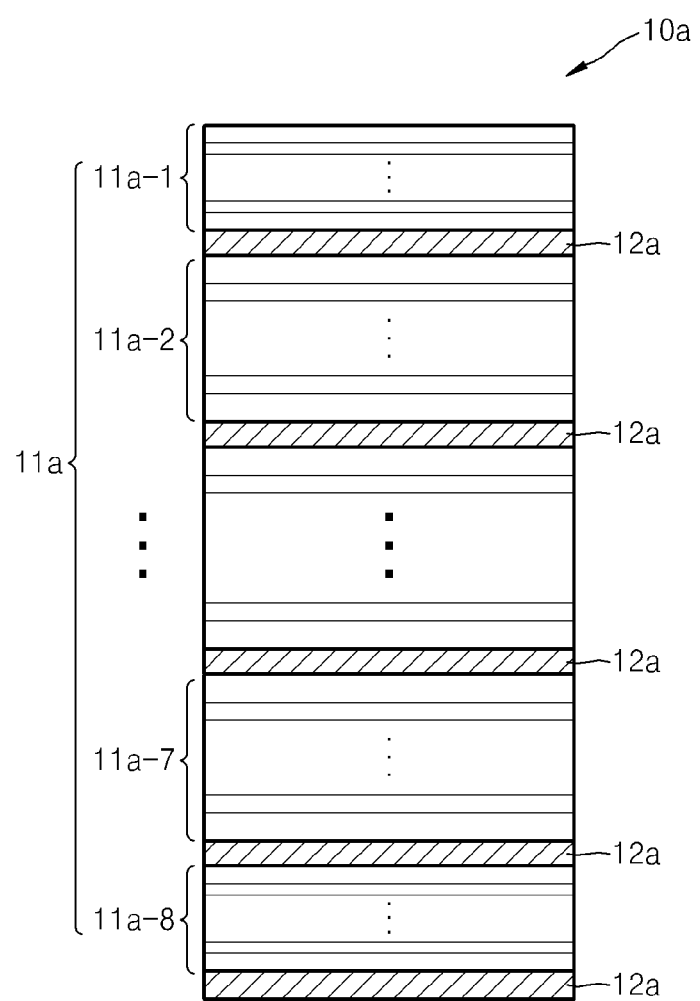
FIG. 3A illustrates an activation layer according to an exemplary embodiment.

FIG. 3A, on the other hand, illustrates another exemplary embodiment of activation layer 10a. As illustrated in FIG. 3A, the activation layer 10a may include an MQW 11a and a carrier block 12a, according to an exemplary embodiment. The MQW 11a may be divided into eight sub-MQWs (11a-1, 11a-2 . . . 11a-7, 11a-8) and, between the sub-MQWs (11a-1, 11a-2 . . . 11a-7, 11a-8), the carrier block 12a may be disposed. The resonance wavelength λ may be 850 nm, and the total optical thickness of the MQW 11a may be 3.5λ. The highest and lowest sub-MQWs (11a-1, 11a-8) of the activation layer 10a may be designed to include four QWs, and the other sub-MQWs (11a-2 , , , 11a-7) may be designed to include seven QWs. In addition, each of the seven carrier blocks may be disposed in-between neighboring sub-MQWs (11a-1, 11a-2 , , , 11a-7, 11a-8). The thickness of each carrier block 12a may be approximately 20 nm.

Figure 3B:
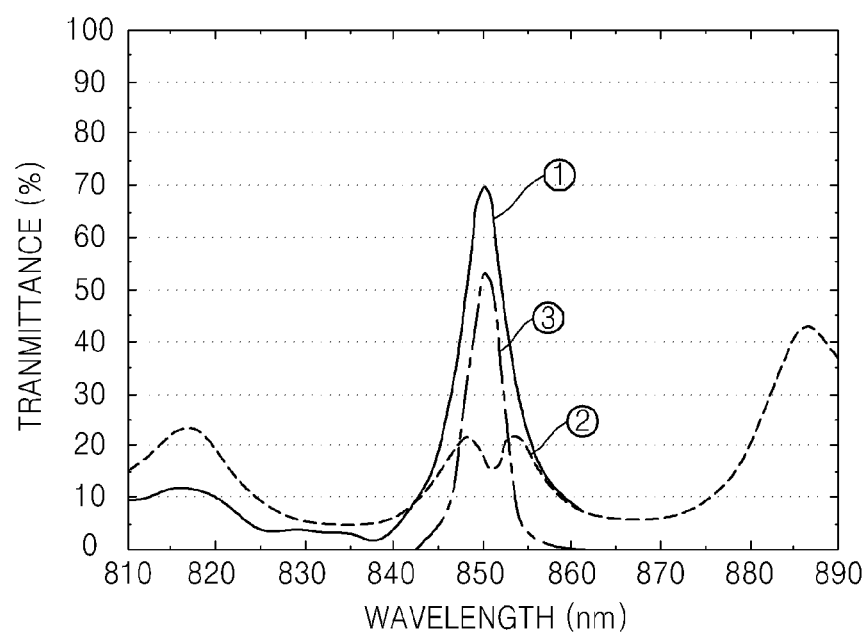
FIG. 3B illustrates a simulation result of the transmittance characteristics of the activation layer illustrated in FIG. 3A.

FIG. 3B illustrates the simulation result, according to an exemplary embodiment, of transmittance characteristics of the activation layer 10a of FIG. 3A. In FIG. 3B, graph '①' represents the transmittance when a voltage is applied, which is approximately 69.9% in the wavelength band of 850 nm. Graph '②' represents the transmittance when a voltage is not applied, which is approximately 17.1% in the wavelength band of 850 nm. Graph '③' represents the transmittance difference between graph '①' and graph '②', which is approximately 52.8% in the wavelength band of 850 nm. When a voltage is not applied, the light absorption efficiency of the activation layer 10a illustrated in FIG. 3A may be increased by approximately 27% over the light absorption efficiency of the activation layer 11 illustrated in FIG. 2A. Thus, when a voltage is not applied, the transmittance of the activation layer 10a, including the carrier block 12a, may be decreased by about 5%. Accordingly, when the activation layer 10a, including the carrier block 12a, is applied to the optical modulator 100a, operating as a shutter, the blocking effect of sunlight may be improved at when the shutter is off. Therefore, when the optical modulator 100a, including the activation layer 10a, is used as a shutter of a 3D image acquisition apparatus, the accuracy of a 3D image may be enhanced due to the increase in the demodulation contrast according to an exemplary embodiment.

Figure 4A:
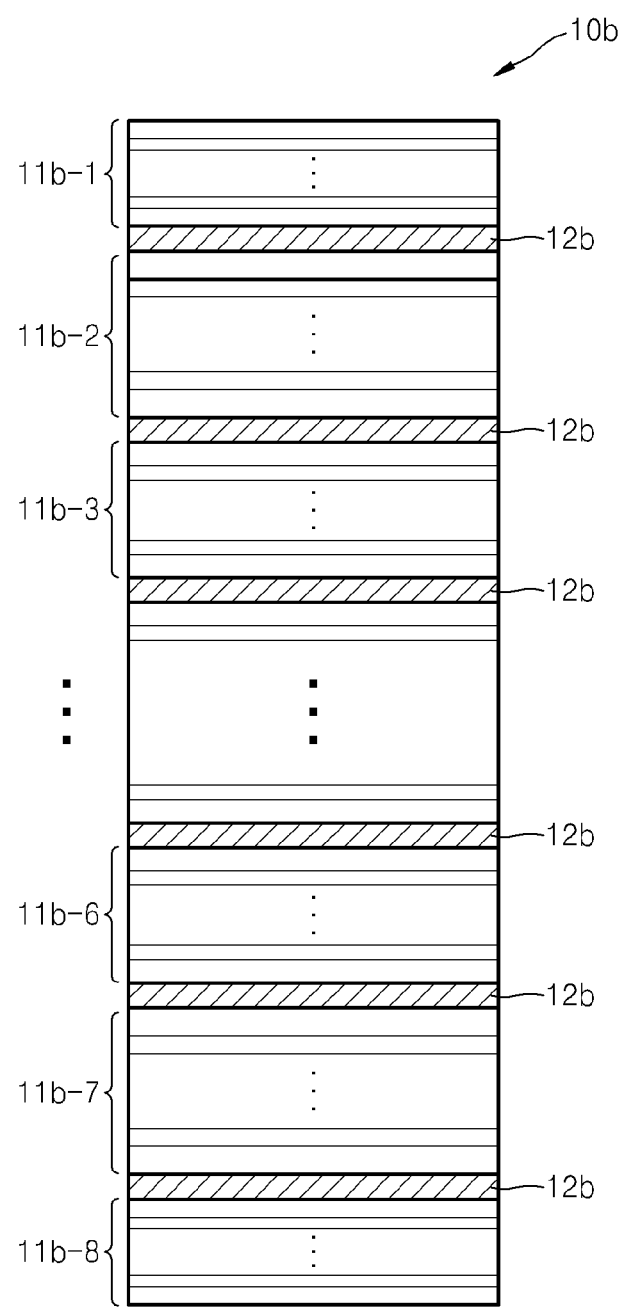
FIG. 4A illustrates an activation layer according to another exemplary embodiment.

FIG. 4A illustrates an activation layer 10b according to another exemplary embodiment. As illustrated in FIG. 4A, the activation layer 10b may be constructed with an MQW 11b and a carrier block 12b, according to an exemplary embodiment. The sub-MQWs (11b-1, 11b-2, 11b-3 . . . 11b-6, 11b-7, 11b-8) may not have the same thickness. When the MQW 11b is divided into eighth sub-MQWs (11b-1, 11b-2, 11b-3 . . . 11b-6, 11b-7, 11b-8) from top to bottom of the activation layer 10b, the first and the eighth sub-MQWs (11b-1, 11b-8) include five QWs, the second and the seventh sub-MQWs (11b-2, 11b-7) include seven QWs, and the third to the sixth sub-MQWs (11b-3 . . . 11b-6) include six QWs, according to an exemplary embodiment. The resonance wavelength may be 850 nm, and the total optical thickness of the MQW 11 may be 3.5λ. In addition, each one of the seven carrier blocks 12b may be disposed between neighboring sub-MQWs (11b-1, 11b-2, 11b-3 . . . 11b-6, 11b-7, 11b-8). The thickness of each carrier block 12 may be about 40 nm.

Figure 4B:
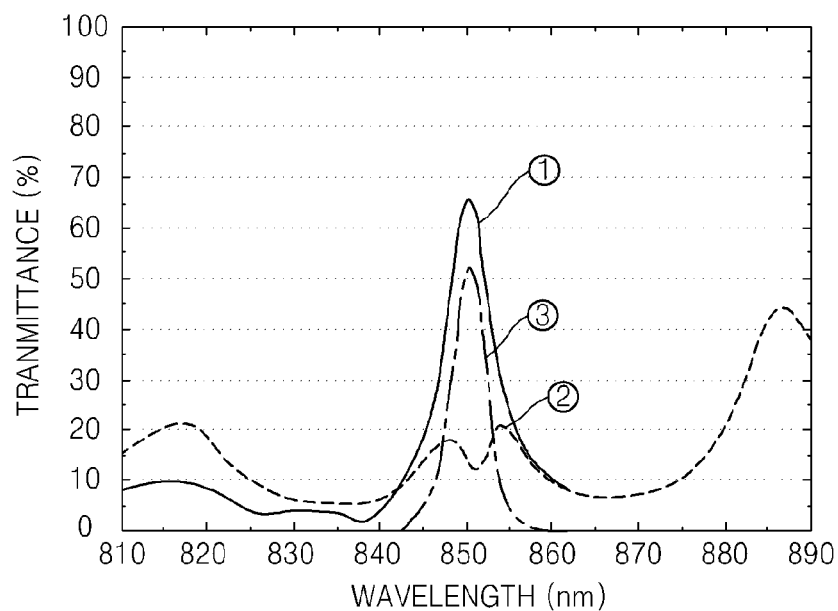
FIG. 4B illustrates a simulation result of the transmittance characteristics of an activation layer according to an exemplary embodiment.

FIG. 4B illustrates the simulation result, according to an exemplary embodiment, of transmittance characteristics of the activation layer 10b. In FIG. 4B, graph '①' represents the transmittance when a voltage is applied, which is approximately 65.6% in the wavelength band of 850 nm. Graph '②' represents the transmittance when a voltage is not applied, which is approximately 13.1% in the wavelength band of 850 nm. Graph '③' represents the transmittance difference between graph '①' and graph '②', which is approximately 52.5% in the wavelength band of 850 nm. When a voltage is not applied, the light absorption efficiency of the activation layer 10b, where the number of QWs is not uniform, may be increased by about 27% over the light absorption efficiency of the activation layer 11 without a carrier block, and may be increased by about 24% over the light absorption efficiency of the activation layer 10a. Accordingly, when a voltage is not applied, the transmittance of the activation layer 10b, where the number of QWs is not uniform, is decreased and that, when the activation layer 10b is applied to the shutter of a 3D image acquisition apparatus, the accuracy of a 3D image may be enhanced due to the increase in demodulation contrast.

FIG. 5 illustrates the optical modulator 100a including activation layer 10 (illustrated in FIG. 1A), according to another exemplary embodiment. Referring to FIG. 5, the optical modulator 100a may include a top reflection layer 20, an activation layer 10 disposed beneath the top reflection layer 20, and a bottom reflection layer 30 disposed beneath the activation layer 10.

The optical modulator 100a may modulate the density of transmitted light by transmitting the incident light and absorbing a portion of the incident light according to an electrical signal. The top reflection layer 20 and the bottom reflection layer 30 may transmit a portion of the incident light, and reflect the light so that resonance may occur in the activation layer 10. The reflection indices of the top reflection layer 20 and the bottom reflection layer 30 may be the same at approximately 50%.

The top reflection layer 20 and the bottom reflection layer 30 may be doped in such a way that both reflection and electrical passage may be performed. For example, the top reflection layer 20 may be doped as p-type, and the bottom reflection layer 30 may be doped as n-type.

The bottom reflection layer 30 may include high refractive index layers and low refractive index layers which are alternately disposed. The lowermost high refractive index layer of the bottom reflection layer 30 may have a thickness smaller than the thickness of other high refractive index layers. The top reflection layer 20 and the bottom reflection layer 30 may be symmetrically disposed with the activation layer 10 in the center. According to an exemplary embodiment, the top reflection layer 20 may include six pairs of high refractive index layers and low refractive index layers, same as the bottom reflection layer 30. Also, high refractive index layers disposed at the top area of the top reflection layer 20 may have a thickness smaller than the thickness of other high refractive index layers for the purpose of phase matching. The bottom reflection layer 30 and the top reflection layer 20 may be distributed Bragg reflectors (DBR).

The bottom part of the bottom reflection layer 30 may include a first contact layer and the bottom part of the top reflection layer 20 may include a second contact layer. The first contact layer and the second contact layer may be disposed only in a partial area of the bottom reflection layer 30 and the top reflection layer 20. For example, the first contact layer and the second contact layer may form a ring shape along the edge of the bottom reflection layer 30 and the top reflection layer 20. Similar to the top reflection layer 20 and the bottom reflection layer 30, the first contact layer may be doped as n-type, and the second contact layer may be doped as p-type. However, the activation layer 10 may not be doped.

Although FIG. 5 does not illustrate a substrate, the optical modulator 100a may be disposed on a substrate. The substrate may be discarded after the optical modulation has been performed. Also, a part of the substrate, for example the central part, may be eliminated for the light to transmit.

Figure 6:
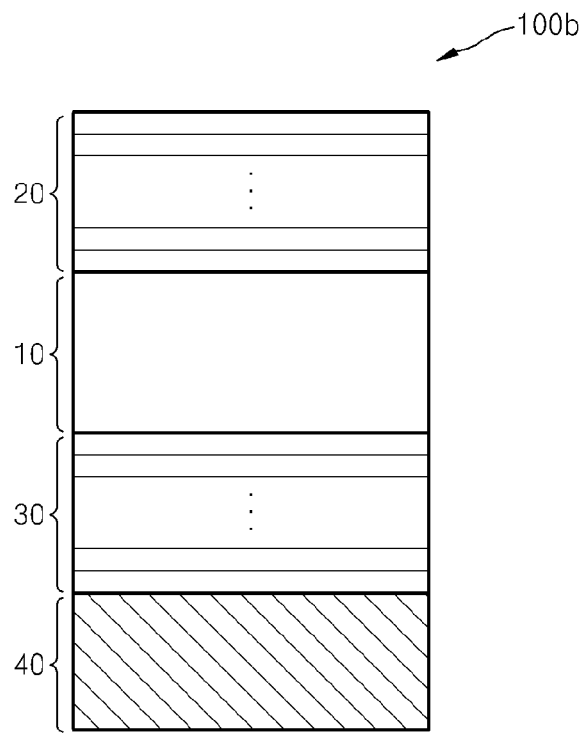
FIG. 6 illustrates an optical modulator according to another exemplary embodiment.

FIG. 6 illustrates an optical modulator 100b according to another exemplary embodiment. The optical modulator 100b illustrated in FIG. 6, in comparison with the optical modulator 100a illustrated in FIG. 5, may additionally include an anti-etching layer 40 at the bottom part of the bottom reflection layer 30. The anti-etching layer 40 may be formed by AlAs or InGaP. With addition of the anti-etching layer 40 to the optical modulator 100b, the transmission characteristics of the optical modulator 100a may be further enhanced. The anti-etching layer 40 may exhibit high transmission characteristics for infrared light for a particular wavelength, such as 50 nm, and may stably maintain the structure of the optical modulator 100b.

Figure 7:
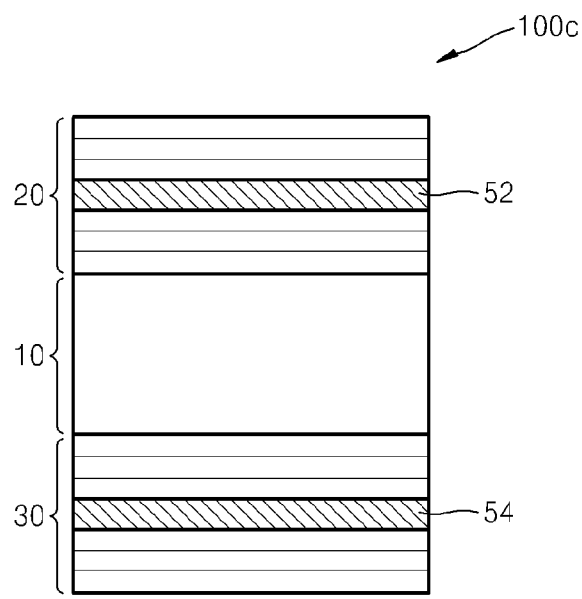
FIG. 7 illustrates an optical modulator according to another exemplary embodiment.

FIG. 7 illustrates an optical modulator 100c according to another exemplary embodiment. The optical modulator 100c illustrated in FIG. 7, in comparison with the optical modulator 100a illustrated in FIG. 5, may additionally include a first micro-cavity layer 52 and a second micro-cavity layer 54 in the top reflection layer 20 and in the bottom reflection layer 30, respectively. Thus, the activation layer 10 of the optical modulator 100c illustrated in FIG. 7 may be the main cavity for resonance, and the first and the second micro-cavity layers 52, 54 may be a supplementary cavity. The optical thickness of the first and second micro-cavity layers 52, 54 may be equal to an integer multiples of λ/2. The first and second micro-cavity layers 52, 54 may be formed with a material that is the same as the material used to make the high refractive index layer and/or the low refractive index layer of the top and bottom reflection layers 20, 30. Each of the first and second micro-cavity layers 52, 54 may be disposed in the top reflection layer 20 and the bottom reflection layer 30. Furthermore, either of the first and second micro-cavity layers 52, 54 may be omitted. Additional installation of the first and second micro-cavity layers 52, 54 may increase the bandwidth of the resonance wavelength.

Figure 8:
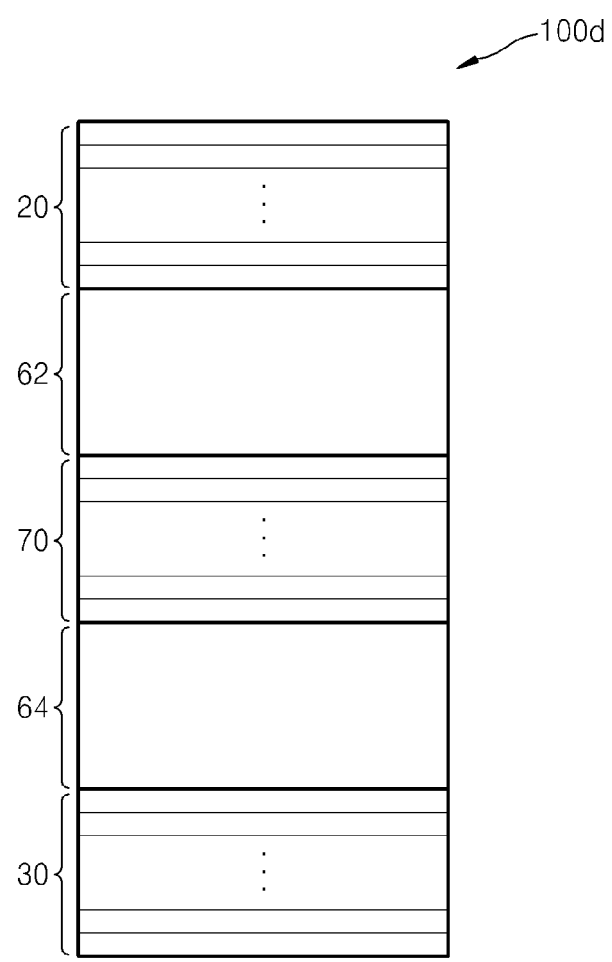
FIG. 8 illustrates an optical modulator according to another exemplary embodiment.

FIG. 8 illustrates an optical modulator 100d according to another exemplary embodiment. Referring to FIG. 8, the optical modulator 100d may include the top reflection layer 20, the first activation layer 62 disposed beneath the top reflection layer 20, the intermediate reflection layer 70 disposed beneath the first activation layer 62, the second activation layer 64 disposed beneath the intermediate reflection layer 70, and the bottom reflection layer 30 disposed beneath the second activation layer 64. The activation layer 10 illustrated in FIG. 1A may be applied to at least one of the first activation layer 62 and the second activation layer 64. In other words, at least one of the first and the second activation layers 62, 64 may include the MQW 11 and carrier block 12. The MQW 11 may include a plurality of QWs and a plurality of QBs. Furthermore, the top reflection layer 20, the intermediate reflection layer 70, and the bottom reflection layer 30 may include high refractive index layers and low refractive index layers alternately.

The top reflection layer 20 and the bottom reflection layer 30 may be doped as electrically the same, and the intermediate reflection layer 70 may be doped as a type that is electrically different the top and bottom reflection layers 20, 30. For example, the top and bottom reflection layers 20, 30 may be doped as n-type, and the intermediate reflection layer 70 may be doped as p-type. On the other hand, when the top and bottom reflection layers 20, 30 are doped as p-type, the intermediate reflection layer 70 may be doped as n-type.

The driving voltage of the optical modulator is conventionally proportional to the total thickness of the activation layer or to the total number of QWs in the activation layer. However, since the optical modulator 100d illustrated in FIG. 8 includes activation layers 62, 64 in an electrically parallel connection, the driving voltage may be decreased by approximately half in comparison with the optical modulator which includes one activation layer with a thickness that is the same as the total thickness of the activation layers 62, 64. Thus, the additional reduction in the electricity consumption may minimize the decrease in performance of the optical modulator due to heat generation.

The optical modulators 100a, 100b, 100c, 100d illustrated in FIGS. 5 through 8 may be transmission-type optical modulators and may not be confined as such. The optical modulators 100a, 100b, 100c, 100d illustrated in FIGS. 5 through 8 may be applied to a reflection-type optical modulator as well. For example, a reflection-type optical modulator may include a bottom reflection layer designed to obtain a reflectance of more than 90% (for example, approximately 98%) and a top reflection layer designed to obtain a reflectance of approximately 30-50%.

Figure 9:
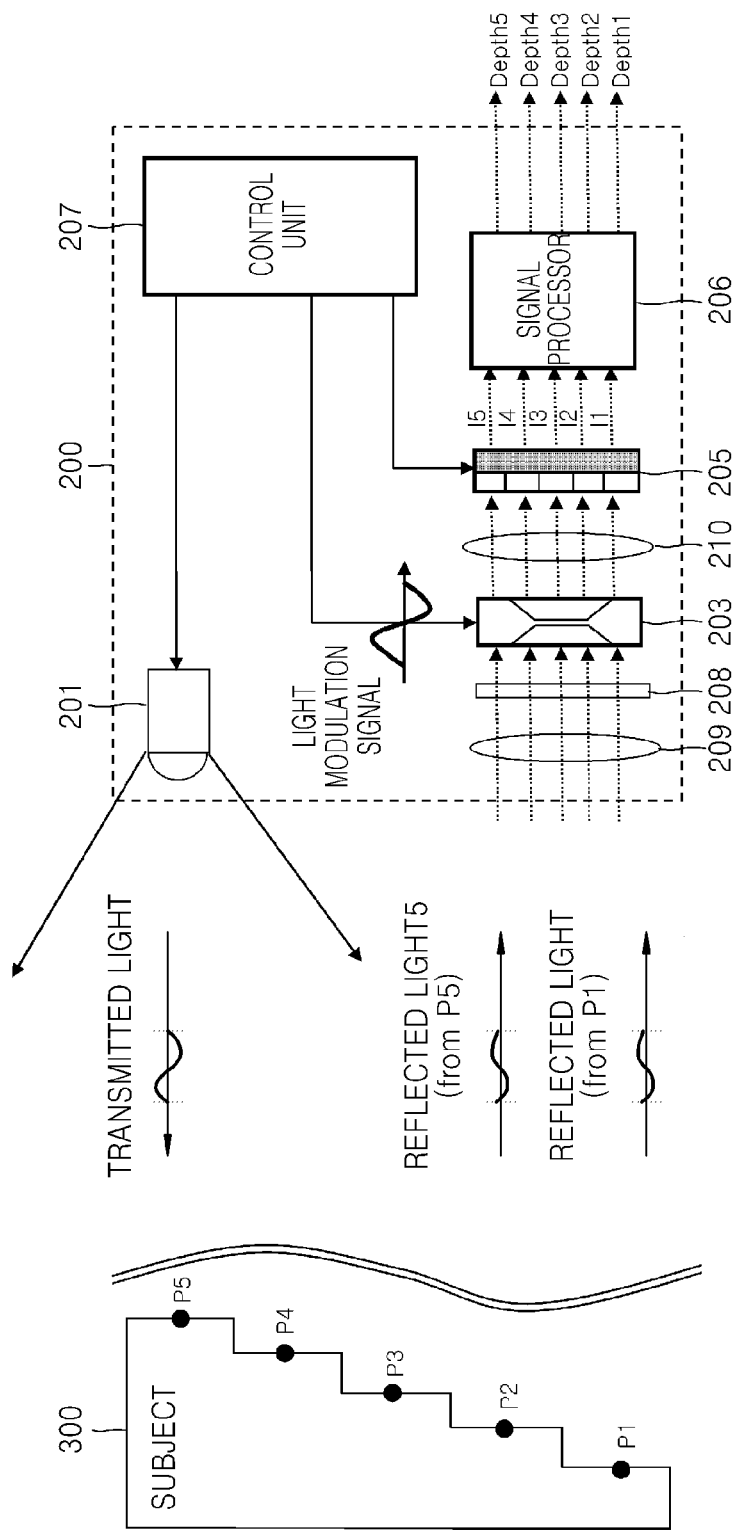
FIG. 9 illustrates a 3D image acquisition apparatus including an optical modulator, according to an exemplary embodiment.

The optical modulators 100a, 100b, 100c, 100d illustrated in FIGS. 5 through 8 may be applied to a 3D image acquisition apparatus. FIG. 9 illustrates a 3D image acquisition apparatus including an optical modulator 203, according to an exemplary embodiment. Referring to FIG. 9, the 3D image acquisition apparatus 200 may include a light source 201 generating light of a particular wavelength, the optical modulator 203 modulating the light reflected from a subject 300, an image pickup device 205 generating a sub-image from the light modulated by the optical modulator 203, a signal processor 206 calculating depth information based on the output of the image pickup device 205 and generating an image including the depth information, and a control unit 207 controlling the movements of the light source 201, the optical modulator 203, the image pickup device 205, and the signal processor 206.

The 3D image acquisition apparatus 200 may additionally include a filter 208 transmitting light of a particular wavelength from among all the wavelengths reflected from the subject 300, and may additionally include a first lens 209, on the side of the optical modulator 203 where the light is incident, concentrating the reflected light into the range of the optical modulator 203, and a second lens 210 concentrating the modulated light between the optical modulator 203 and the image pickup device 205 into the range of the image pickup device 205.

The light source 201, according to an exemplary embodiment, may include an LED or an LD emitting light in a near infrared range (NIR) or approximately 850 nm so that the emitted light is invisible to the human eyes, for safety, but may not be limited in the wavelength band thereto.

The transmitted light, transmitted from the light source 201 to the subject 300, may include a periodical continuation function with a particular period. For example, the transmitted light may include a specifically defined waveform, such as a sine wave, a ramp wave, and a square wave, but may include waveforms of undefined, generalized types. The light source 201 may concentrate the light transmission to the subject 300 for a specified period of time with the period length under the control of the control unit 207.

The optical modulator 203 may modulate the light reflected from the subject 300 under the control of the control unit 207. For example, the optical modulator 203 may modulate the magnitude of the transmitted light by a gain change according to an optical modulation signal of a particular waveform. The optical modulator 203 may obtain variable gains.

The optical modulator 203 may function at a high modulation speed (upwards of ten MHz, according to an exemplary embodiment) to identify the phase difference or the movement time of the light depending on the distance. The optical modulators previously described may be applied to the optical modulator 203. FIG. 9 illustrates the optical modulator 203 as a transmission type, but a reflection type optical modulator may be used.

The image pickup device 205 may function to select the light modulated by the optical modulator 203 under the control of the control unit 207 and to generate the sub-image. The image pickup device 205 may utilize one single photo-sensor, such as a photodiode or photo-integrator, to measure the distance to a single point on the subject 300. However, for the simultaneous measurement to multiple points (for example P1, P2, P3, P4 and P5) on the subject 300, a two-dimensional or a one-dimensional array of multiple numbers of diodes or other optical detectors may be utilized. For example, the image pickup device 205 may include a charge-coupled device (CCD) sensor or complementary metal-oxide semiconductor (CMOS) sensor in a two-dimensional array. The image pickup device 205 may generate one sub-image for each individual reflected light signal (for example reflected light from P1, reflected light from P5 as shown in FIG. 9).

The signal processor 206 may calculate the depth information based on the output of the image pickup device 205, and generate a 3D image including the depth information. The signal processor 206 may, for example, be designed as a dedicated integrated circuit (IC), or as software disposed in the 3D image acquisition apparatus 200. In the case of software, the signal processor 206 may be stored in a separate, movable storage medium.

The optical modulator 203 may increase the light concentration efficiency by arranging a carrier block restricting the carrier movement to areas with low light concentration efficiency, according to an exemplary embodiment.

Also, the accuracy of a 3D image may be enhanced by using an optical modulator with high light concentration efficiency.

Although a few exemplary embodiments have been shown and described, the present disclosure is not limited to the aforementioned particular exemplary embodiments, and could be variously modified and achieved by those skilled in the art to which the present disclosure pertains without deviating from the principles and spirit of the present disclosure which is claimed in the claims, and such modifications should not be understood separately from the technical concept or prospect of the present disclosure.

What is claimed is:

1. An optical modulator comprising:
a multiple quantum well (MQW) comprising a plurality of sub-multiple quantum wells (sub-MQWs), each of the plurality of sub-MQWs comprising a plurality of quantum wells (QWs) and a plurality of quantum barriers (QBs); and at least three carrier blocks disposed in the MQW, both surfaces of each of the at least three carrier blocks being in direct physical contact with respective QBs in respective neighboring sub-MQWs among the plurality of sub-MQWs, to restrict carrier movement within the MQW, wherein each of the at least three carrier blocks comprises at least one of $Al_xGa_{1-x}As$ ($0.31 < x \leq 1$) and InGaP, wherein a refractive index of each of the at least three carrier blocks is greater than a refractive index of each of the plurality of QBs, and wherein an energy band of all portions in the at least three carrier blocks is higher than an energy band of all portions in the plurality of QBs in the MQW.

2. The optical modulator of claim 1, wherein the at least three carrier blocks comprises a transparent material.

3. The optical modulator of claim 1, wherein a total optical thickness of the MQW is equal to $N*(\lambda/2)$, where $\lambda$ is a resonance wavelength and N is an integer.

4. The optical modulator of claim 1, wherein the MQW and the at least three carrier blocks are part of an activation layer of the optical modulator.

5. The optical modulator of claim 4, wherein the MQW is symmetrical about a center of the activation layer.

6. The optical modulator of claim 5, further comprising:
a bottom reflection layer; and
a top reflection layer,
wherein the bottom reflection layer is disposed on a bottom surface of the activation layer, and
the top reflection layer is disposed on a top surface of the activation layer.

7. The optical modulator of claim 6, wherein the optical modulator is a transmission type optical modulator, and
a reflectance of the bottom reflection layer is equal to a reflectance of the top reflection layer.

8. The optical modulator of claim 7, wherein either one or each of the bottom reflection layer and the top reflection layer comprises a micro-cavity layer, and
a thickness of the micro-cavity layer is equal to $N*(\lambda/2)$, where $\lambda$ is a resonance wavelength and N is an integer.

9. The optical modulator of claim 8, wherein the bottom reflection layer comprises a first refractive index layer and a second refractive index layer, a thickness of the second refractive index layer being different from a thickness of the first refractive index layer,
the top reflection layer comprises a third refractive index layer and a fourth refractive index layer, a thickness of the fourth refractive index layer being different from a thickness of the third refractive index layer,
the first refractive index layer and the second refractive index layer are alternately laminated, and
the third refractive index layer and the fourth refractive index layer are alternately laminated.

10. The optical modulator of claim 9, wherein the micro-cavity layer comprises a material that is the same as a material of any one or any combination of the first refractive index layer, the second refractive index layer, the third refractive index layer, and the fourth refractive index layer.

11. The optical modulator of claim 5, further comprising:
a bottom reflection layer;
another activation layer disposed on a surface of the bottom reflection layer;
an intermediate reflection layer disposed on a surface of the other activation layer, and having a surface on which the activation layer is disposed; and
a top reflection layer disposed on a surface of the activation layer.

12. An optical modulator, comprising:
a first multiple quantum well (MQW) comprising a first plurality of quantum wells (QWs) and a first plurality of quantum barriers (QBs);
a first carrier block to restrict carrier movement, and disposed on a surface of the first MQW;
a second MQW comprising a second plurality of QWs and a second plurality of QBs, and disposed on a surface of the first carrier block;
a second carrier block to restrict carrier movement, and disposed on a surface of the second MQW;
a third MQW comprising a third plurality of QWs and a third plurality of QBs, and disposed on a surface of the second carrier block;
a third carrier block to restrict carrier movement, and disposed on a surface of the third MQW; and
a fourth MQW comprising a fourth plurality of QWs and a fourth plurality of QBs, and disposed on a surface of the third carrier block,
wherein both surfaces of each of the first carrier block, the second carrier block, and the third carrier block are in direct physical contact with respective QBs in respective neighboring MQWs among the first MQW, the second MQW, the third MQW, and the fourth MQW, and
a refractive index of each of the first carrier block, the second carrier block, and the third carrier block is greater than a refractive index of each of the first plurality of QBs, the second plurality of QBs, the third plurality of QBs, and the fourth plurality of QBs.

13. The optical modulator of claim 12, wherein either one or each of the first MQW and the second MQW has an optical thickness that is equal to $N*(\lambda/2)$, where $\lambda$ is a resonance wavelength and N is an integer.

14. The optical modulator of claim 12, wherein a thickness of the first MQW is equal to a thickness of the second MQW.

15. The optical modulator of claim 12, wherein a thickness of the first MQW is different from a thickness of the second MQW.

* * * * *